UNITED STATES PATENT OFFICE.

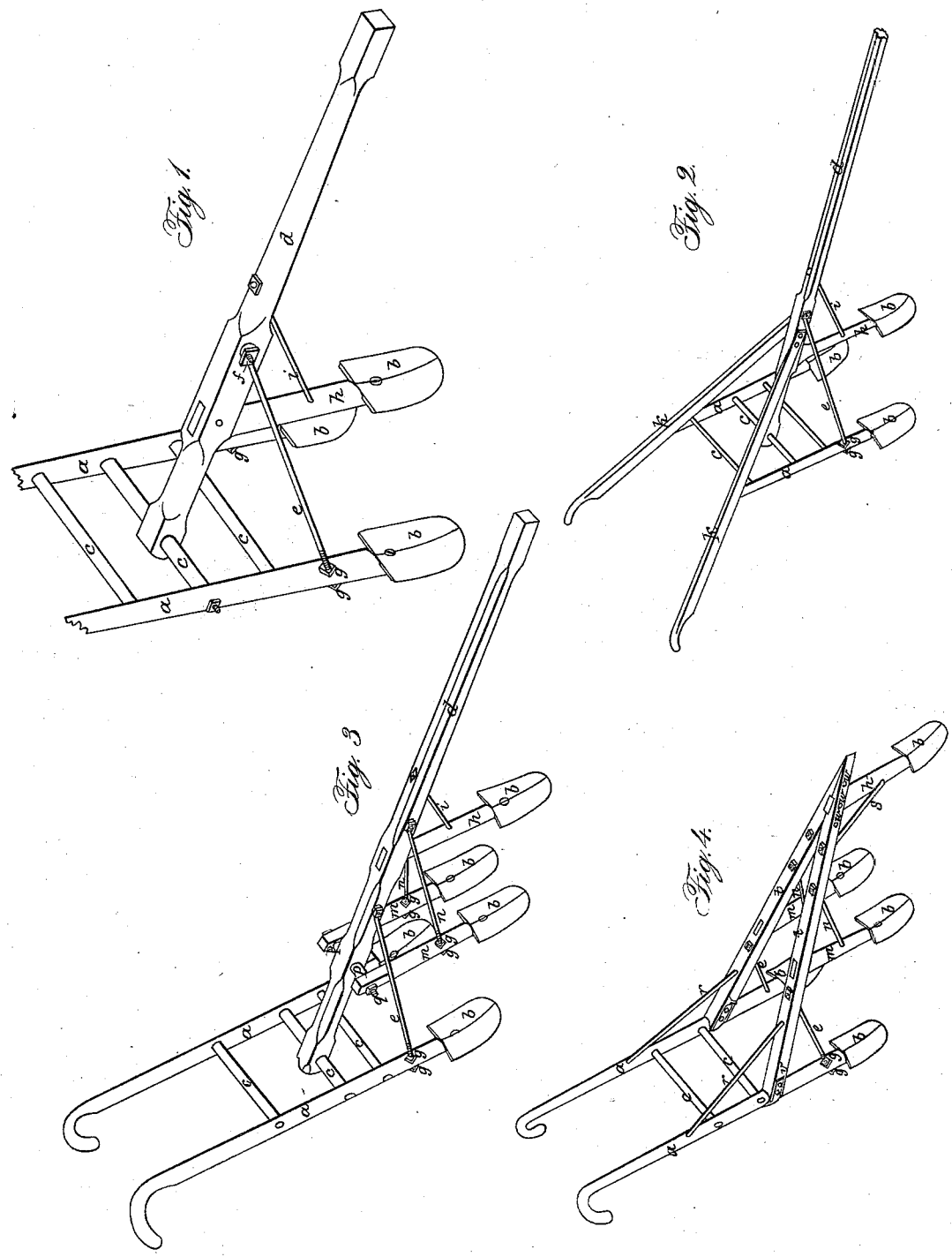

ALMOND HARRISON, OF BLISSFIELD, MICHIGAN.

IMPROVEMENT IN CULTIVATORS.

Specification forming part of Letters Patent No. 4,170, dated September 2, 1845.

*To all whom it may concern:*

Be it known that I, ALMOND HARRISON, of Blissfield, in the county of Lenawee and State of Michigan, have invented a new and Improved Shovel-Pointed Cultivator; and I do hereby declare the following to be a full and exact description thereof, reference being had to the accompanying drawings, making a part of this specification.

The nature of my invention consists in so arranging and securing in a light frame three or more shovel-pointed cultivator-points that they can be easily guided and managed and brought as near to whatever is desired to be cultivated as a single-pointed plow or cultivator, and also in such a manner that my improved shovel-pointed cultivator can be as easily directed among stumps, roots, rocks, grass, &c., without danger of clogging, and at the same time thoroughly cultivating the ground.

To enable others skilled in the art to make and use my invention, I will proceed to describe its construction and operation.

In the accompanying drawings, Figure 1 is a perspective elevation of my improved shovel-pointed cultivator as I generally use it. I construct and bend a couple of guiding-handles, $a\ a$, of similar size and shape to those used in the common plow. I generally connect and fasten the handles $a\ a$ together by three cross-pieces, $c\ c\ c$, passing an iron bolt through the center one, with a screw upon one end for the purpose of securing the three. On the front side of the lower ends of the handles $a\ a$, I fasten the ordinary shovel-shaped cultivator-points, $b\ b$. To the cultivator-handles thus constructed and prepared I attach the straight beam $d$ of the same by passing the center cross-piece $c$ through its rear end and allowing it to turn upon the same. The beam $d$ is braced and made fast in its proper position by the braces $e\ e$, their upper ends being secured to opposite sides of the beam by the screw-bolt $f$, and their lower ends passing through the handles $a\ a$, just above the cultivator-points $b\ b$ upon the same. There are screws at the lower ends of both the braces $e\ e$, and regulating-nuts $g\ g$ are placed on each— one each side of the handles—by the turning and adjusting of which the angle of inclination of the handles can be varied to suit the different purposes for which it may be applied and soils in which it may be used, or the front end of the beam can be raised or lowered. At about the same distance (more or less) from the rear end of the beam $d$ that the handles are separated from each other I fasten to the under side of the beam the standard $h$, having a cultivator-point $b$ attached to it, of the same size and shape of those upon the handles $a\ a$. The standard $h$ is the same height that the handles are from their lower ends to the middle cross-piece $c$, and is braced in front by the brace $i$.

Fig. 2 in the accompanying drawings is a modification of my improved cultivator as I sometimes construct it, when I cannot obtain suitable timber or have not the requisite fixtures for bending the handles. This is constructed and operates in the same manner as Fig. 1, save that the guiding-handles, instead of being bent upon the cultivating-standards $a\ a$, are straight pieces $k\ k$, secured to each side of the beam just in the rear of the braces $e\ e$, and are carried back, inclining upward, and are secured to the tops of the standards $a\ a$.

Fig. 3 is another modification of my improved cultivator, arranged and operating in the same manner as in Fig. 1, save that the standard $h$ in this modification is placed farther forward, and two intermediate cultivating-standards, $m\ m$, are introduced midway between this and the handles opposite each other on each side of the beam $d$. They are kept at a proper distance from the beam, so as to bring the cultivating-points $b\ b$, attached to them, in a line with those on the handles and the standard $h$ by the thimbles $p\ p$. The bolt $q$ passes through the standards and thimbles and confines them to the beam. The standards $m\ m$ are braced and their positions regulated by the braces $n\ n$ and the regulating-screws $g\ g$ in the same manner that the handles are. The cultivating-standard $h$ in Figs. 1, 2, and 3 being stationary, the front end of the beam $d$ in each may be raised or lowered at pleasure by changing and adjusting the position of the regulating-screws $g\ g$; or, if desired, this standard may be adjustable in its position, like the others.

Fig. 4 is another modification of my improved cultivator, in which I dispense with the beam *d* and supply its place with the two frame pieces *t t*, confined to the handles (which are the same as in the modifications shown in Figs. 1 and 3) by the iron straps *v v* and the upper and lower braces, *e e* and *r r*. The pieces *t t* are joined together in front and secured by the bolts *w w*. The cultivating-standards *m m* and *h*, or more, if desired, are secured to the pieces *t t* by tenon and mortise and fastened by braces *n* and *s*.

What I claim as my invention, and desire to secure by Letters Patent, is—

The manner of securing the cultivator-beam *d* to one of the cross-pieces *c c* of the handles or standards *a a*, (upon which it turns,) in combination with the manner of fastening and securing the same to each other, and regulating the angle of inclination of the handles and cultivating-points and the position of the beam by means of the adjusting-braces *e e* and nuts *g g*, constructed and operating substantially in the manner and for the purpose herein set forth, and represented in the different modifications of my new and improved shovel-pointed cultivator.

ALMOND HARRISON.

Witnesses:
   Z. C. ROBBINS,
   T. C. DONN.